Jan. 3, 1950 H. JAFFE 2,493,145

PIEZOELECTRIC CRYSTAL APPARATUS

Filed April 29, 1948 3 Sheets-Sheet 1

INVENTOR.
HANS JAFFE
BY *Harries A. Mumma Jr.*
ATTORNEY

INVENTOR.
HANS JAFFE
BY *Harris A. Mumma Jr.*
ATTORNEY

Jan. 3, 1950 H. JAFFE 2,493,145

PIEZOELECTRIC CRYSTAL APPARATUS

Filed April 29, 1948 3 Sheets-Sheet 3

*INVENTOR.*
HANS JAFFE
*BY* Harries A. Mummah
ATTORNEY

Patented Jan. 3, 1950

2,493,145

UNITED STATES PATENT OFFICE 2,493,145

PIEZOELECTRIC CRYSTAL APPARATUS

Hans Jaffe, Cleveland, Ohio, assignor to The Brush Development Company, Cleveland, Ohio, a corporation of Ohio Application April 29, 1948, Serial No. 23,905

11 Claims. (Cl. 171—327)

Figure 2:
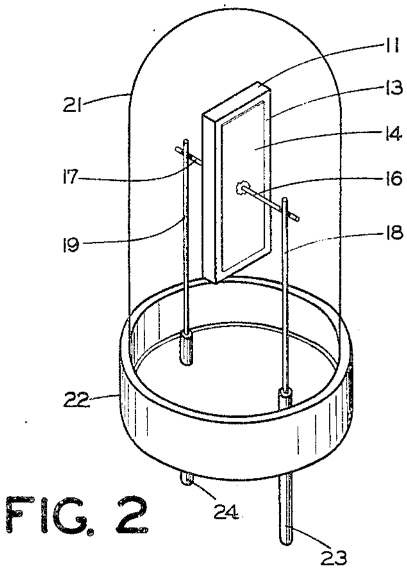

This invention relates to improved piezoelectric crystal apparatus, and more particularly to apparatus of this type including a piezoelectric element cut from a single crystal of the substance ethylenediamine tartrate, $C_6H_{14}N_2O_6$. Such piezoelectric crystal apparatus may be of several types, including apparatus for transducing between electrical and mechanical energy and electrical circuit apparatus such as oscillators and filters.

Piezoelectric elements of ethylenediamine tartrate cut with faces having various orientations referred to the crystallographic axes of the crystalline substance have been proposed, and some of these cuts have proved useful in electrical wave filters. All of the cuts proposed except one are of the lateral expander type, that is, the useful mechanical stress or strain is of an expansive or contractive nature and in a direction perpendicular to the effective electric field. The only useful cut not of this type now known in the art is of a type utilizing a thickness-shear mode of motion of the crystal plate, wherein the stress or strain occurs in a plane parallel to the electric field. A family of crystal plates may be cut from this material with the thickness in the direction of the Y-axis. Such a so-called Y-cut plate heretofore has been used with the sides of the plate so oriented with respect to the crystallographic axes and with the plate so excited as to obtain an expander type of piezoelectric effect. Published data have indicated clearly that no useful piezoelectric face-shear effect could be expected with a Y-cut plate of ethylenediamine tartrate.

It has now been discovered, however, that a properly oriented Y-cut plate of ethylenediamine tartrate is subject to vigorous piezoelectric excitation of the face-shear modes of motion. With proper associated apparatus plates of ethylenediamine tartrate of generally quadrilateral or rectangular outline which have a major face lying in, or moderately inclined to, the plane of the X and Z coordinate axes may be made to respond in a face-shear mode of motion even though the orientation of the edges of the plate with respect to the X-axis deviates rather widely from an orientation at which the face-shear mode is most strongly excited. Crystal plates having the latter orientation are described and claimed in the copending application entitled "Piezoelectric crystal plates," Serial Number 23,904, filed April 29, 1948, in the name of Hans Jaffe and assigned to the same assignee as the present invention. There is illustrated in detail in the aforesaid specification the crystallographic orientation of such plates, and there are discussed therein the fundamental piezoelectric properties of such plates as understood by the prior art and as now determined in conformity with the present invention.

It is an object of the invention, therefore, to provide new and improved piezoelectric crystal apparatus which substantially avoids one or more limitations of the prior apparatus including piezoelectric crystal elements.

It is another object of the invention to provide a new and more sensitive piezoelectric crystal apparatus including a piezoelectric element of ethylenediamine tartrate.

It is a further object of the invention to provide piezoelectric crystal apparatus including crystal plates of ethylenediamine tartrate affording a new and improved piezoelectric operation.

It is also an object of the invention to provide a new and improved frequency-selective piezoelectric crystal apparatus.

It is a still further object of the invention to provide a novel electro-mechanical transducer utilizing an efficient electro-mechanical system involving Y-cut plates of ethylenediamine tartrate.

In accordance with the invention, a piezoelectric crystal apparatus comprises a piezoelectric crystal element of the substance ethylenediamine tartrate having a pair of electroded surfaces with the normal to the plane of each of these surfaces inclined not more than 15° from the Y-axis of the crystalline substance. The apparatus also comprises means for exciting the crystal element primarily in a face-shear mode of motion.

For a better understanding of the present invention, together with other and further objects thereof, reference is had to the following description taken in connection with the accompanying drawings, and its scope will be pointed out in the appended claims.

Figure 4:
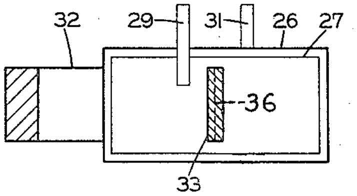
Figure 3:
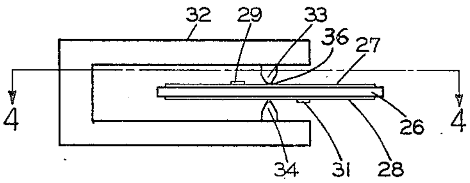
Figure 5:
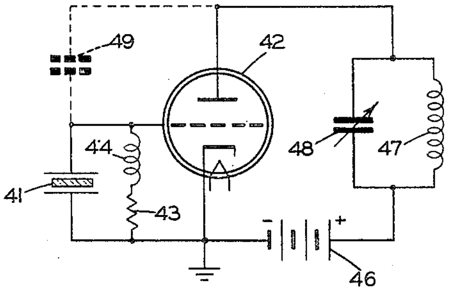
Figure 1:
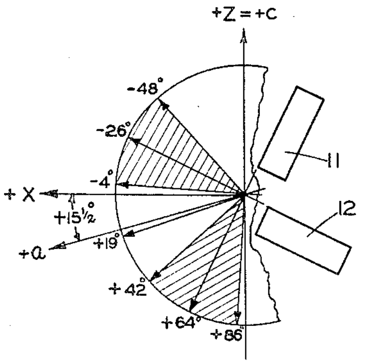
Figure 6:
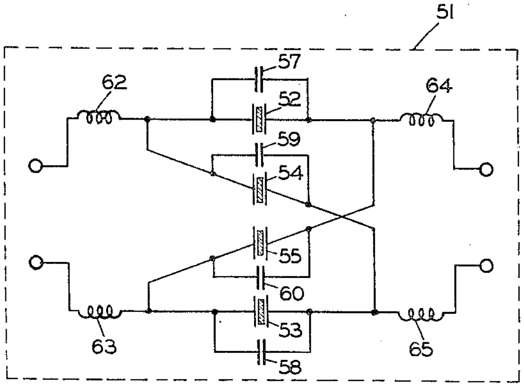
Figure 7:
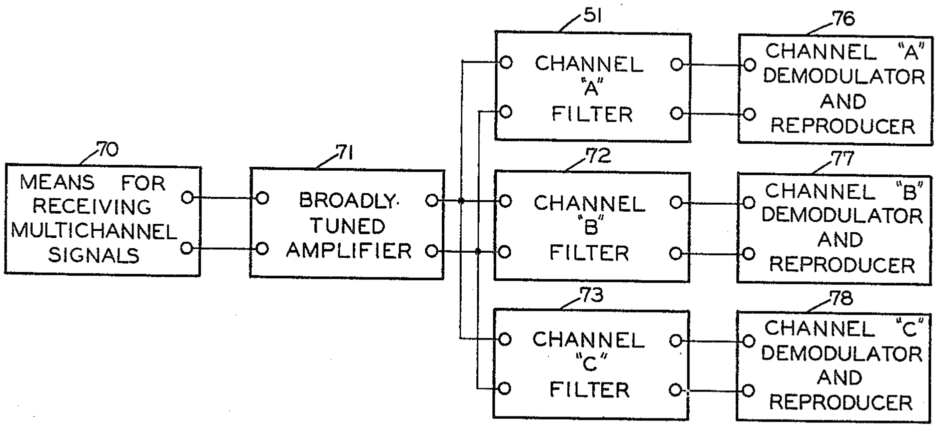
Figure 8:
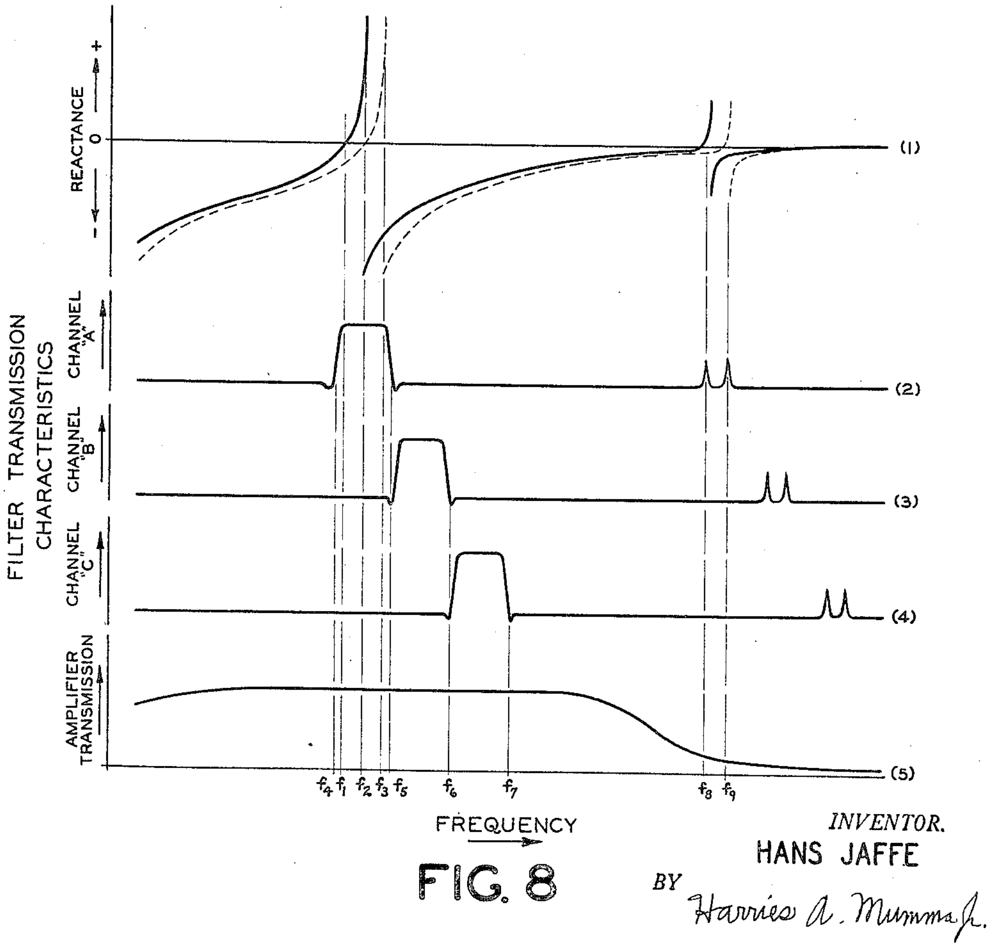
Figures 9, 10, 11, 12, 13:
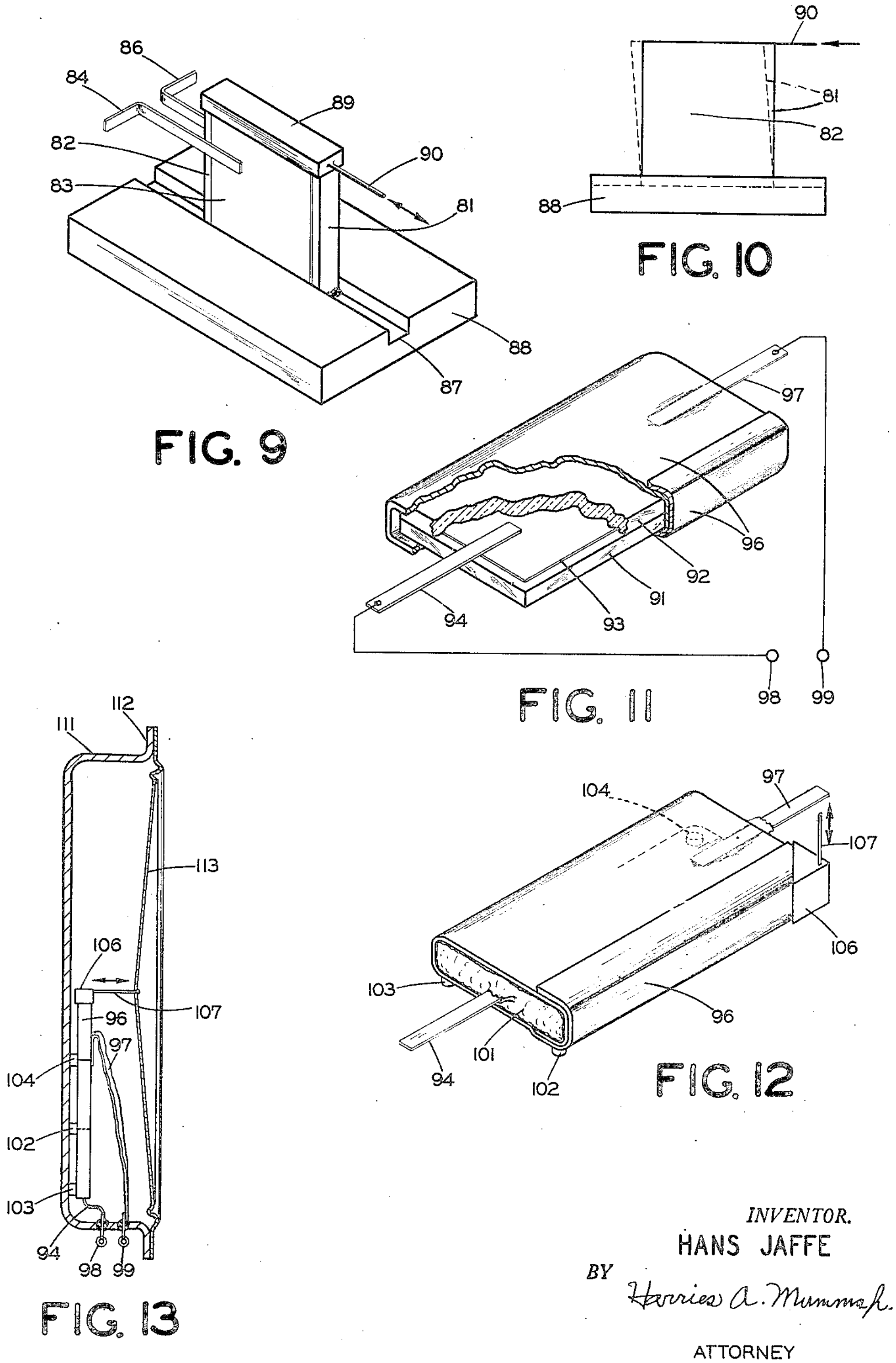

In the drawings, Fig. 1 is a polar diagram in which the angular directions represent the projections of the edges of crystal plates on the XZ plane, and the projections on the same plane of the outlines of two rectangular crystal plates also are represented to one side of the polar diagram; Fig. 2 is a perspective view of an electroded crystal element mounted in a glass envelope; Fig. 3 is a front elevation of a crystal element in a holder including a knife edge mounting arrangement; Fig. 4 is a sectional plan view of the Fig. 3 arrangement taken along the line 4—4 of Fig. 3; Fig. 5 is a schematic representation of an oscillatory crystal apparatus embodying the invention; Fig. 6 is a schematic circuit diagram of a filter network including crystal elements; Fig. 7 is a block diagram of another embodiment of the invention in the form of a portion of a communication system involving frequency-selective circuit apparatus of the type illustrated in Fig. 6; Fig. 8 is a series of related graphs representing the operation of the circuits of Fig. 6 and 7; Fig. 9 is a perspective view of an electro-mechanical transducer apparatus embodying the invention;

Fig. 10 is a partial view in front elevation of the piezoelectric element of the Fig. 9 apparatus, illustrating the operation thereof; Fig. 11 is a cutaway perspective view of a crystal element asembly for use in another transducer apparatus embodying the invention; Fig. 12 is a perspective view of the piezoelectric element assembly of Fig. 11 with the addition of mounting and driving attachments; and Fig. 13 is a sectional view of a complete transducer including the arrangement of Fig. 12.

Referring to Fig. 1 of the drawings, there is shown a polar diagram representing the XZ-plane of a monoclinic type of crystalline substance, in this case ethylenediamine tartrate. The diagram is based on the conventional method of representing the crystallographic directions in crystals of the monoclinic system with reference to a set of rectangular coordinates. This method of representation is described, insofar as it is useful in representing the crystal cuts of the present invention, in the aforementioned copending application, in the drawing of which Fig. 3 is a view in the XZ-plane of a crystal showing the relationships of the crystallographic and coordinate axes and illustrating the crystallographic orientation of certain preferred crystal plates. In Fig. 1 of the drawings appended hereto the radial lines on the polar diagram represent the angular positions of the sides of various crystal plates having major faces in the same XZ-plane, or, if the major surfaces of the plates are inclined somewhat from the XZ plane, the radial lines represent the projections of these sides on the XZ-plane. Since the coordinate system and the representation of crystallographic directions used in Fig. 1 are conventional, it is deemed sufficient to state here only that the positive direction of the Y coordinate axis and the *b* crystallographic axis is vertically upward from the plane of the polar diagram, the positive directions of the Z coordinate axis and of the *c* crystallographic axis coincide, and the positive direction of the *a* crystallographic axis is rotated in a counterclockwise or positive sense from the positive direction of the X coordinate axis at the angle of about 15.5° thereto characteristic of ethylenediamine tartrate.

The face-shear mode of motion of rectangular plates having major faces lying in or near the XZ-plane may be most strongly excited when the plate has an orientation such that the projection of each pair of opposed sides of the rectangle on the XZ-plane individually forms an angle with the X-axis substantially equal to one of the complementary angles +64° and −26°. Two such plates are represented in Fig. 1 in association with the polar diagram thereof, the outlines of the plates being shown alongside the polar diagram and with one side of each plate in alignment with the direction on the polar diagram corresponding to the orientation of that side. Thus, the plate 11 has its longer sides extending in the +64° direction relative to the X-axis, while the plate 12 has its longer sides in the −26° direction. The shorter sides of each plate then have the same orientation as the longer sides of the other plate. The direct piezoelectric excitation of the lateral expander modes is very small in plates thus oriented so as to have the maximum face-shear piezoelectric effect, while the elastic cross-coupling between the shear and expander modes is quite small, at least in most arrangements utilizing these face-shear plates.

When rectangular plates are cut with the orientation of two of the sides in the +19° direction intermediate the +64° and −26° directions, however, the use of the plate as a piezoelectric element can involve little or no piezoelectric excitation of the face-shear mode of motion, while such a plate may be excited easily in the expander mode of motion. Piezoelectric response involving either a face-shear mode or an expander mode may be obtained with any Y-cut plates excluding those with edges oriented in the vicinity of the +19° or −71° directions. Since it is desirable that the face-shear mode be more easily excited if that mode is to be utilized primarily in piezoelectric crystal apparatus, the orientation of the plate ordinarily should be nearer an optimum orientation for exciting the face-shear mode than an optimum orientation for exciting the expander mode. Accordingly, for a plate of generally quadrilateral outline lying in, or inclined somewhat to, the XZ-plane, the projection of each of two sides of the quadrilateral on the XZ-plane ordinarily should form individually with the X-axis an angle which is within 22½°, or within 22° practically speaking, of one of the complementary angles +64° and −26°. Thus, the angles contemplated lie between +42° and +36° and between −48° and −4°. These angular limits are represented by the shaded portions of the polar diagram of Fig. 1. It is apparent from Fig. 1 that either of the rectangles 11 and 12 may be rotated in the plane of the drawing through positive or negative angles of up to 22° without carrying the orientation of the sides of these rectangular plates beyond the limits represented by the shaded areas on the polar diagram. Of course, whenever ease of excitation of the face-shear mode is the only important design consideration, and frequently in other cases as well, it is preferable to orient the rectangular plates so that their sides come within several degrees of coinciding with the +64° and −26° directions; the projections of the sides of the rectangle then form angles with the Y-axis substantially equal to +64° and −26°.

Fig. 2 shows in perspective a piezoelectric crystal element of the substance ethylenediamine tartrate, such as the plate 11 of Fig. 1 or any plate oriented as just discussed for operation in the face-shear mode. The face-shear plate is shown mounted suitably for use in a piezoelectric crystal apparatus. The plate 11 has two major faces of which the edge portions of the front face 13 are visible in Fig. 2. These faces are provided with electrodes, of which the electrode 14 on the front face 13 also appears in Fig. 2. For mechanical support and electrical connections a small rod or wire may be fastened to each of the major faces. Thus, a rod 16 is fastened to the surface 13 by means of a suitable conductive cement and a rod 17 is fastened similarly to the opposed major face. One end of each of two additonal rods 18 and 19 conveniently may be spot-welded to the rods 16 and 17 respectively. The crystal element and its electrodes and supporting rods are shown enclosed in a glass envelope 21, which may be sealed to a base 22 of insulating material and evacuated, using the techniques of vacuum tube construction. The rods 18 and 19 are fastened conductively to pins 23 and 24 respectively. These pins, which pass through and are sealed to the base 22, may be received by spring contacts, not shown, in any suitable socket arrangement, thus providing not only electrical connections to the electrodes of the crystal element but also a mechanical fastening for the entire device shown in Fig. 2. To provide electrical contact between the rods 16 and 17 and the respective electrodes, the electrodes may be applied to the major faces of the crystal plate by condensing evaporated gold on the surfaces after the rods are fastened thereto. Although the electrode 14 is shown with margins at the edge portions of the face 13, it frequently is desirable to have the electrode cover the entire face.

An alternative form of mounting for a crystal plate is shown in Figs. 3 and 4. A plate 26 has electrodes 27 and 28 on its major faces and connections or lead strips 29 and 31 in contact with the electrodes 27 and 28 respectively. The electroded plate 26 is placed within a holder 32 of stiff material having a U-shaped cross-sectional configuration. Mounting bars 33 and 34 are provided and fastened to the opposed surfaces within the holder 32. The bars have knife edges pressing against the opposed faces 27 and 28 along lines running centrally across the width of the plate; thus the edge of bar 33 contacts the electroded surface 27 along a line 36. To avoid rotation of the plate 26 about one of the knife edges, these edges are rounded somewhat where they press against the faces 27 and 28, thus facilitaating centering of the plate between the edges.

The electroded crystal element 26 may be excited by any suitable means, such as an electrical arrangement of the type illustrated in Figs. 5 or 7 and described hereinbelow or a mechanical driving arrangement of the type illustrated in Fig. 9 and arranged for moving one of the shorter edge faces of the plate 26 up and down as viewed in Fig. 4. When so excited, the pressure of the knife edges, exerted upon the element by virtue of the resilience of the holder 32 and bars 33 and 34, constrains the element to move in a mode of motion having a nodal line extending centrally in the width direction. Thus, for example, the element may be excited primarily in the fundamental face-shear mode of motion in which the elastic waves propagate lengthwise rather than widthwise of the plate so that the frequency characteristic is determined by the length of the plate. The face-shear mode, which has a nodal line extending centrally in the length direction and a frequency characteristic determined primarily by the width of the plate, thus is suppressed. Likewise any tendency of the plate to move in a mode involving expansion in the width direction also is suppressed by the pressure of the knife edges along the width of the plate. If the dimensions and orientation of the plate are such that a face-shear mode and a mode involving expansion in the width direction both tend to be excited and the resonant frequencies for the two modes are too close to each other to permit easy suppression of the widthwise expander mode, for example by circuit means such as those described hereinbelow in connection with Figs. 5 or 7, the use of the knife edge mounting of Figs. 3 and 4 may serve to suppress the unwanted expander mode. In this case the knife edge mounting is part of a means for exciting the crystal element primarily in a face-shear mode of motion having a central nodal line widthwise of the element.

Fig. 5 represents schematically the circuit of a crystal oscillator including a resonant crystal element 41 of the substance ethylenediamine tartrate having a pair of electroded surfaces with the normal to the plane of each of the surfaces inclined not more than 15° from the Y-axis of the crystalline substance. The element 41 in a specific application may be electroded rectangular Y-cut shear element mounted in the manner illustrated in Fig. 2. In the Y-cut shear element the major electroded surfaces are substantially parallel to each other and the normal to the plane of each of these surfaces substantially coincides with the Y-axis of the crystalline substance. The orientation of the sides of the plate in the XZ-plane may be any orientation sufficiently removed from that in which the sides form angles of +19° and −71° with the X-axis. Generally speaking, however, whether or not the electroded surfaces are in the XZ-plane, the crystal plate should have a generally quadrilateral outline, and should have the projection of each of two sides of the quadrilateral on the XZ-plane individually forming an angle with the X-axis of the plate within a range of 22° of one of the complementary angles +64° and −26°, since orientations within this range favor the operation of face-shear crystal plates. When the plate is used in a resonant circuit it is preferable that it have a generally rectangular outline, or at least have the pair of opposed sides perpendicular to the desired direction of propagation of elastic waves cut substantially parallel to each other. Quadrilateral or rectangular crystal plates lying in, or somewhat inclined to, the XZ-plane and having their sides oriented within the range just mentioned are most easily excited in a face-shear mode without an undesirably strong tendency toward excitation in other unwanted modes.

In addition to the crystal element 41 the oscillatory circuit of Fig. 5 may comprise a conventional circuit arrangement. As illustrated schematically, this circuit includes a triode vacuum tube 42 with grounded cathode. The crystal element 41 is connected between the cathode and the control electrode of the triode 42, and is shunted by a resistor 43 and a series choke inductor 44 to provide a suitable bias voltage. The anode-cathode circuit comprises a source of anode potential 46 in series with a parallel resonant circuit made up of an inductor 47 and a variable condenser 48. A condenser 49 may be connected between the anode and control electrodes of the tube 42, but this condenser is shown in dotted lines because the interelectrode capacitance of the vacuum tube ordinarily supplies the desired coupling between these electrodes.

In operation, any excitation in the anode-cathode circuit of the tube 42 tends to produce oscillations at or near the frequency of resonance of the tuned circuit 47, 48. The resulting oscillatory voltage appears across the capacitance 49 and the impedance of the crystal element 41, and stabilizes at such a frequency that it is applied regeneratively to the control-electrode circuit of the tube. This tends to set up oscillations, the frequency of which is determined in a well-known manner by the steep impedance-frequency characteristic of the crystal element 41. The condenser 48 is adjusted so that the circuit 47, 48 resonates near the resonant frequency of the element 41 oscillating in a face-shear mode of motion. Then the frequency of oscillation of the entire circuit is controlled quite closely by the frequency characteristics of the crystal element, these characteristics being determined in turn by the dimensions of that element. However, the resonant circuit 47, 48 exercises some control over the oscillatory frequency of the circuit. For example, the frequency of oscillation may be modified slightly in a known manner by a slight detuning of the circuit 47, 48 from the face-shear mode resonance of the element 41. Conversely any tendency of the element 41 to oscillate at another natural resonant frequency of the element, for example a resonant frequency associated with an expander mode of motion, is suppressed by the detuned or susceptive nature of the admittance of the resonant circuit 47, 48 at such other frequency. Hence the oscillatory circuit of Fig. 5, including this resonant circuit, constitutes frequency-selective means for exciting the element 41 primarily in a face-shear mode of motion so as to utilize the frequency-selective characteristics of that mode of motion of the element.

There is represented schematically in Fig. 6 a filter network 51 of the well known lattice type; it includes piezoelectric crystal elements such as the element of Fig. 2 and is useful in frequency-selective apparatus embodying the present invention. This network comprises four crystal elements, each of which advantageously may be one of the crystal cuts recommended hereinabove for use in the oscillator circuit in Fig. 5 and may be mounted in the manner illustrated in Fig. 2. These four crystal elements include two series arm elements 52, 53 and two lattice arm elements 54, 55. To standardize the effective capacitance of these elements each one is shunted by a small condenser 57, 58, 59, 60 respectively. Additionally, inductors 62, 63, 64, 65 are provided in series with each input and output terminal of the lattice to complete the filter network 51. This network is of a type which has become well known, and modifications in the various series and lattice impedances to obtain desired over-all frequency characteristics are within the skill of those versed in the art.

The block diagram of Fig. 7 represents the receiving portion of a multichannel communication system including a means 70 for receiving multichannel signals. The receiver 70 may be, for example, a radio receiver or the terminal equipment of a telephone line. Multichannel systems are well known, and sometimes are referred to as carrier systems. In one type of carrier system, only a single side band of the modulation-frequency spectrum associated with the carrier wave is used, so that the frequency band assigned to one carrier includes the frequency of that carrier and its one side band, while the frequency of the next carrier almost adjoins the side band frequency of the highest-frequency modulation signal associated with the one carrier.

The output terminals of the receiver 70 are coupled to the input terminals of a broadly tuned amplifier 71. In a superheterodyne radio receiver the amplifier 71 might be the intermediate frequency amplifier. The output terminals of the amplifier 71 are connected to the input terminals of each of three filters 51, 72, and 73. The filter 51 is identical with the filter network of Fig. 6 and is assigned to the carrier designated A and its associated channel. The filters 72 and 73 are similar to the filter network 51, but are tuned to different frequencies by suitable choice of the series arm and lattice arm elements of the network. Filter 72 is assigned to a channel B adjoining the channel A, while the remaining filter 73 is the channel C filter for the next channel. While the system is illustrated with only three channels, additional channels may be added in a similar manner. The output terminals of the filters 51, 72, and 73 are coupled to the input terminals of respective demodulator and reproducer units 76, 77, and 78, which are assigned to the channels A, B, and C respectively.

The operation of the system represented in Fig. 7 is well known and will not be described in detail except as the operation relates to the present invention. Thus, the weak multichannel signals induced in receiver 70 are amplified in the broadly tuned amplifier 71 and applied to each of the channel filters 51, 72, and 73. These filters reject the carrier and side-band signals of all the channels except the channel assigned to the individual filter. Signals in the assigned channel, however, are transmitted through each filter to the respective demodulator and reproducer unit, where the demodulated signals are reproduced in a useful manner. For example, in a sound-frequency system the demodulated signals are subjected to audio-frequency amplification and the amplified signals applied to suitable telephone receivers or loud speakers individually located for use by persons interested in the intelligence transmitted over the individual channels.

The operation of the frequency-selective portions of the receiver system of Figs. 6 and 7 will be explained in greater detail with reference to the graphs of Fig. 8. The effective reactance of each of the series arm crystal elements 52, 53 and their associated condensers 57 and 58 is represented by the solid-line curve of Fig. 8 (1). These two elements are identical and with their associated condensers have a resonant frequency $f_1$ and an antiresonant frequency $f_2$. The two lattice arm elements 54 and 55 likewise are the same, but differ from the series arm elements in being dimensioned for a somewhat higher resonant frequency, specifically the frequency $f_2$ coinciding with the antiresonant frequency of the series arms. The lattice arms have an antiresonant frequency $f_3$, and the effective reactance of each of them is represented by the broken-line curve of Fig. 8 (1). The transmission characteristic of the channel A filter without the inductance elements 62—65 would be a band-pass characteristic with approximate lower and higher frequency limits of the pass band at the frequencies $f_1$ and $f_3$. The addition of the series inductors 62—65 extends the pass band in a well known manner to a still lower low-frequency limit $f_4$ and a still higher high-frequency limit $f_5$. Design of the channel B filter 72 is quite similar to that of the channel A filter 51 except that the filter elements are chosen to place the lower frequency limit of the channel B pass band at about the frequency $f_5$, instead of $f_4$, and the upper frequency limit at about the frequency $f_6$, providing a pass band of practically the same width as the band between the frequencies $f_4$ and $f_5$. Likewise the channel C filter 73 is designed to have a pass band extending from frequency $f_6$ to a still higher frequency $f_7$. The band-pass filter transmission characteristics of the filters 51, 72, and 73 are represented by the curves of Figs. 8 (2), 8 (3), and 8 (4) respectively for the respective channels A, B, and C. Thus each of the demodulator and reproducer units 76, 77, 78 for the three channels receives only the carrier and side-band signals for the respective channels, the signals being in the frequency bands $f_4$—$f_5$, $f_5$—$f_6$, and $f_6$—$f_7$ respectively. Due to the high coupling coefficient, exceeding 0.20 for the Y-cut shear elements of preferred orientation, relative frequency band-widths of the order of 2% may be obtained with a simplified network omitting the inductors 62—65.

If the crystal elements 52—55 are comprised of ethylenediamine tartrate plates oriented substantially as represented in Fig. 1 for the plate 11 or 12, the filter networks are likely to exhibit no peaks in the transmission characteristics at frequencies other than those in the pass bands designated in Figs. 8 (2), 8 (3), and 8 (4) until the harmonics of these frequencies are reached. The crystal elements usually are operated in the fundamental face-shear mode, and the signals applied to receiver 70 ordinarily would not reach frequencies high enough to cause excitation of the harmonics of this face-shear mode. Thus, while the transmission characteristics of the filters may contain peaks in the neighborhood of such harmonics of the fundamental face-shear mode frequency, no signals of these frequencies are present in the system so as to be passed by the filters.

However, in many cases the individual crystal elements in the filters may exhibit resonances at frequencies corresponding to other unwanted modes of motion, such as a length-controlled expander mode in a crystal operated primarily in a width-controlled face-shear mode. Abrupt changes of reactance with frequency for the filter elements 52 and 53, corresponding to resonance and anti-resonance for an expander mode at frequencies close to a higher frequency $f_8$, are depicted in the solid-line curve of Fig. 8 (1), while a similar resonance phenomenon exhibited by the filter elements 54 and 55 is depicted near a frequency $f_9$ in the broken-line curve. These resonances cause peaks in the transmission characteristic of the channel A filter 51 near the frequencies $f_8$ and $f_9$, as indicated in the graph of Fig. 8 (2). Similar peaks at somewhat higher frequencies are evident in the graphs of Figs. 8 (3) and 8 (4) for the filters 72 and 73. Referring again to Fig. 8 (2), it is noted that the reactance-frequency characteristics of the various arms of the filter network 51 do not coact to provide a rather flat pass band between the frequencies $f_8$ and $f_9$ as is the case between the frequencies $f_1$ and $f_3$ for the face-shear mode for which the filter is designed, but rather provide individual peaks near $f_8$ and $f_9$. Nevertheless, when the received signals cover a frequency spectrum including components at the frequency $f_8$ and higher, and when the crystal cuts used in the filter elements are such as to permit substantial excitation of resonances corresponding to an unwanted mode, it may be expedient to design the amplifier 71 so as to afford considerable attenuation at the frequency $f_8$ and higher. The transmission characteristic of the amplifier 71 is depicted in Fig. 8 (5). This characteristic has a broad pass band, such as commonly is obtained with intermediate-frequency amplifiers, and this band extends at least between the frequencies $f_4$ and $f_7$ to include the pass bands of the filters for the three channels. The transmission characteristic of amplifier 71 falls off above the frequencies of the pass band of the filter 73 for the highest-frequency channel and drops to a relatively low value at the frequency $f_8$. This transmission characteristic of the amplifier 71 in some cases may be obtained with the use of the usual amplifier circuits, all of which introduce attenuation starting at some relatively high frequency.

Since the transmission characteristic of the amplifier 71 is such as to prevent excitation of the crystal elements in the filters in other modes, for example near the frequencies $f_8$ and $f_9$, the receiver 70 and the amplifier 71, in combination with the filters, constitute means for exciting the crystal elements of the filters primarily in a face-shear mode of motion at frequencies within the pass bands of the filters. It is noted also that the various filter elements in the filter network 51, for example, may utilize crystal plates having resonant characteristics near the desired pass band of the filter substantially as represented by Fig. 8 (1), but that the individual crystal plates may be made to have different resonant frequencies for the unwanted modes by utilizing crystal plates having different ratios of width to length. When this is done, the transmission peaks, shown in Figs. 8 (2), 8 (3), and 8 (4) at frequencies $f_8$ and higher, may be broken up into more numerous but smaller peaks in the same high-frequency region. These peaks then may be so small as to require less attenuation in amplifier 71 at the higher frequencies, or in some cases even may be so small as to permit no important excitation of the filters at those frequencies. In the latter case the receiver 70 alone may serve to excite the filter elements primarily in a face-shear mode without the interposition of the amplifier 71 having the transmission characteristic of Fig. 8 (5).

A piezoelectric crystal apparatus in the form of an electro-mechanical transducer comprising a Y-cut piezoelectric crystal plate of the type suggested for use in the Fig. 2 arrangement is illustrated in Fig. 9. This transducer includes a crystal plate 81 having a major surface 82 lying in or near the XZ-plane and covered largely or completely by an electrode 83. Cemented conductively to the electrode 83 is a lead 84. The opposed major face of the plate 82 also is provided with an electrode, not shown, having another lead 86. The leads 84 and 86 may be connected to any suitable electrical circuit, not shown, for example a sensitive meter device for indicating the voltage developed by the element as a result of electrical charge accumulated on the electrodes upon mechanical deformation of the plate 81. The lower edge face of the plate 81 rests in and is cemented to a groove 87 provided in a block 88 of insulating material. The upper edge face is provided with a cap 89 of insulating material. Mechanical coupling means in the form of a rod 90 is fastened to one end of the cap 89 and extends in a direction parallel to the upper edge face of the plate 81. As indicated by the arrows, the rod 90 is arranged for motion longitudinally of the rod, as by adapting the rod for placement of its free end on a surface moving transversely of the rod so that low and high spots on the surface cause the rod to move normally of the surface.

The operation of the transducer arrangement of Fig. 9 is illustrated schematically in Fig. 10, in which the plate 81 having the surface 82 is shown resting in the block 88 with the rod 90 fastened at an upper edge of the plate. When a longitudinal force represented by the arrow is applied to the rod, the plate 81 deforms and acquires a shape represented in an exaggerated manner by the dashed lines. The motion of the plate is seen to be a face-shear motion. By virtue of the piezoelectric properties of the crystal element of Fig. 9 a voltage is developed between the leads 84 and 86 proportional to the force applied to the rod 90. Similarly a voltage applied between the leads 84 and 86 causes a face-shear strain in the crystal element and a corresponding longitudinal motion of the rod 90. A force or torque applied to the rod 90 and tending to deform the plate 81 in conformity with another mode of motion, such as an expander mode, cannot be transmitted effectively through the rod 90 due to the bending flexibility of the rod; similarly deformation of the plate 81 in such other mode under the influence of an applied voltage cannot result in an effective motion of the rod 90. Accordingly, the rod 90 is part of a mechanical coupling means motion of which is associated primarily with a face-shear mode of motion of the piezoelectric element. If the element is excited electrically by application of electrical signals to the leads 84 and 86, the only motion of the element which substantially affects the rod 90 is the face-shear motion. Thus, the rod effectively constitutes a means for exciting the element either mechanically or electrically primarily in a face-shear mode.

The cut-away perspective view of Fig. 11 shows the construction of a piezoelectric crystal element containing two ethylenediamine tartrate crystal plates designed to operate in a face-shear mode of motion in another type of transducer. The two plates 91 and 92 advantageously are similarly oriented with respect to the crystallographic axes and are placed one below the other with the positive directions of the corresponding axes of each plate coinciding. The crystal cuts used may be any of the cuts mentioned in connection with the Fig. 2 arrangement. The upper surface of the lower plate 91 is provided with an electrode 93, to which is fastened conductively a connection or lead strip 94. The lower surface of the upper plate 92 is provided with a similar electrode, not shown separately from the electrode 93, and the two electroded surfaces are cemented together using a conductive cement. The two plates thus connected together are covered, as by a foil wrapping 96, to which is affixed another lead 97. The leads 94 and 97 may be connected to terminals 98 and 99 respectively.

As viewed in Fig. 12, the foil forming the outer electrode 96 is wrapped around the entire crystal assembly with the exception of the end portions, including the end from which the lead 94 protrudes. The overlapping portions of the foil are cemented together, and the foil is wide enough to extend beyond the end portions of the crystal assembly, leaving a fillet at each end. This fillet then is filled by pouring in heated wax, which forms a plug at each end, as illustrated by the wax plug 101 surrounding the lead 94. The whole assembly thus is provided with a water-resistant covering to prevent damage to the crystal plates due to moisture. This method of covering a piezoelectric element is described and claimed in the copending application Ser. No. 678,713, filed June 24, 1946, in the name of Frank Swinehart and assigned to the same assignee as the present invention, which application issued October 4, 1949, as Patent No. 2,483,677. Such a moisture-resistant covering preserves the advantageously high electrical resistivity of the ethylenediamine tartrate elements.

The margins provided between electrode 93 and the edges of plates 91 and 92 serve, along with the wax plug 101, to insulate the electrode 93 from the covering 96. The covering 96 functions as two outer electrodes, one on the bottom surface of the plate 91 and the other on the top surface of the plate 92. Thus, application of a voltage between the terminals 98 and 99 causes electrical fields in the two plates 91 and 92 of opposite polarities, the two outer electrodes provided by the covering 96 being connected effectively in parallel and being oppositely disposed with respect to the central electrode 93. The face-shear motion of the two plates in opposite senses, resulting from these fields of opposite polarities, tends to produce an over-all deformation of a twisting nature and of a magnitude providing efficient transducer action. Twister piezoelectric devices of this character are described in Reissue Patent No. 20,680 of Charles B. Sawyer, and reference may be had to this patent for a detailed discussion of the operation of twister devices of this type.

For utilizing the twister device in an acoustical system, three corners of the covered bottom surface of the crystal assembly are provided with mounting pads 102, 103, and 104, as shown in Fig. 12. The fourth corner is provided with a cap 106 to which is attached a mechanical coupling rod 107 arranged for motion longitudinally of the rod. The pads 102—104 are of somewhat resilient material to permit some flexing in the pads during motion of the twister assembly, but when the pads are mounted on a rigid surface most of the motion associated with electro-mechanical transducing is a motion longitudinally of the rod 107. Accordingly, the crystal element assembly covered by the outer wrapping 96 is shown in Fig. 13 with the pads 102—104 secured to the inside surface of a drawn case 111 having a flange 112. The edges of a diaphragm 113 are secured to the flange 112, and the free end of the rod 107 is fastened to the center of the diaphragm. The leads 94 and 97 pass through suitable insulated bushings in the case 111 to the terminals 98 and 99. The type of mounting for this electro-mechanical transducer utilizing the pads 102—104 and the rod 107 is described and claimed in Patent No. 2,105,011, issued January 11, 1938, to Alfred L. W. Williams.

In operation, a voltage may be placed across the terminals 98, 99 in the Fig. 13 arrangement. The resulting electrical fields in the crystal plates produce a twisting of the crystal element, as described in connection with Fig. 12, causing a longitudinal motion of the rod 107 and corresponding displacements of the diaphragm 113. If the diaphragm 113 is in contact with the atmosphere, acoustical waves corresponding to the wave form of the voltage applied to the terminals 98, 99 are generated in the air. Conversely, acoustical waves impinging upon the diaphragm 113 cause longitudinal movement of the rod 107. This movement results in a twisting action of the crystal element, which is resolved into face-shear stresses applied to the crystal plates 91, 92. These stresses cause a voltage to be developed across the terminals 98, 99 corresponding in wave form to the acoustical waves impinging upon the diaphragm 113. Since the rod 107 translates mechanical energy effectively only in its longitudinal direction, it forms a mechanical coupling means motion of which is associated primarily with twisting of the crystal element and hence primarily only with the corresponding face-shear mode of motion of the individual crystal plates 91 and 92 comprising the piezoelectric element. Consequently, the Fig. 13 arrangement, utilizing the mounting arrangement shown in Fig. 12 and the rod 107 connected to the diaphragm 113, comprises means for exciting the piezoelectric element primarily in a face-shear mode of motion.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A piezoelectric crystal apparatus comprising, a piezoelectric crystal element of the substance ethylene-diamine tartrate having a pair of electroded surfaces with the normal to the plane of each of said surfaces inclined not more than 15 degrees from the Y-axis of the crystalline substance, and means for exciting said element primarily in a face-shear mode of motion.

2. A piezoelectric crystal apparatus comprising, a piezoelectric crystal element of the substance ethylene-diamine tartrate having a pair of electroded surfaces with the normal to the plane of each of said surfaces inclined not more than 15 degrees from the Y-axis of the crystalline substance, and circuit means for exciting said element primarily in a face-shear mode of motion so as to utilize the frequency-selective characteristics of said mode of motion of said element.

3. An electro-mechanical transducer comprising, a piezoelectric crystal element of the substance ethylene-diamine tartrate having a pair of electroded surfaces with the normal to the plane of each of said surfaces inclined not more than 15 degrees from the Y-axis of the crystalline substance, and mechanical coupling means motion of which is associated primarily with a face-shear mode of motion of said piezoelectric element.

4. A piezoelectric crystal apparatus comprising, a piezoelectric crystal element of the substance ethylenediamine tartrate having a pair of substantially parallel electroded surfaces with the normal to the plane of each of said surfaces substantially coinciding with the Y-axis of the crystalline substance, and means for exciting said element primarily in a face-shear mode of motion.

5. A piezoelectric crystal apparatus comprising, a resonant piezoelectric crystal element of the substance ethylenediamine tartrate having a pair of electroded surfaces with the normal to the plane of each of said surfaces inclined not more than 15 degrees from the Y-axis of the crystalline substance, and frequency-selective means for exciting said element primarily in a face-shear mode of motion.

6. A piezoelectric crystal apparatus comprising, a resonant piezoelectric crystal element of the substance ethylenediamine tartrate having a pair of substantially parallel electroded surfaces with the normal to the plane of each of said surfaces substantially coinciding with the Y-axis of the crystalline substance, and frequency-selective means for exciting said element primarily in a face-shear mode of motion.

7. An electro-mechanical transducer comprising, a piezoelectric crystal element of the substance ethylenediamine tartrate having a pair of substantially parallel electroded surfaces with the normal to the plane of each of said surfaces substantially coinciding with the Y-axis of the crystalline substance, and mechanical coupling means motion of which is associated primarily with a face-shear mode of motion of said piezoelectric element.

8. A piezoelectric crystal apparatus comprising, a resonant piezoelectric crystal plate of the substance ethylenediamine tartrate having a pair of electroded surfaces with the normal to the plane of each of said surfaces inclined not more than 15 degrees from the Y-axis of the crystalline substance, having a generally quadrilateral outline, and having the projection of each of two sides of the quadrilateral on the XZ-plane individually forming an angle with the X-axis of said plate within 22 degrees of one of the complementary angles +64 and −26 degrees, and frequency-selective means for exciting said element primarily in a face-shear mode of motion.

9. A piezoelectric crystal apparatus comprising, a resonant piezoelectric crystal plate of the substance ethylenediamine tartrate having a pair of electroded surfaces with the normal to the plane of each of said surfaces inclined not more than 15 degrees from the Y-axis of the crystalline substance, having a generally quadrilateral outline, and having the projection of each of two sides of the quadrilateral on the XZ-plane individually forming an angle with the X-axis of said plate substantially equal to one of the complementary angles +64 and −26 degrees, and frequency-selective means for exciting said element primarily in a face-shear mode of motion.

10. An electro-mechanical transducer comprising, a piezoelectric crystal plate of the substance ethylenediamine tartrate having a pair of electroded surfaces with the normal to the plane of each of said surfaces inclined not more than 15 degrees from the Y-axis of the crystalline substance, having a generally quadrilateral outline, and having the projection of each of two sides of the quadrilateral on the XZ-plane individually forming an angle with the X-axis of said plate within 22 degrees of one of the complementary angles +64 and −26 degrees, and mechanical coupling means motion of which is associated primarily with a face-shear mode of motion of said piezoelectric element.

11. An electro-mechanical transducer comprising, a piezoelectric crystal plate of the substance ethylenediamine tartrate having a pair of electroded surfaces with the normal to the plane of each of said surfaces inclined not more than 15 degrees from the Y-axis of the crystalline substance, having a generally quadrilateral outline, and having the projection of each of two sides of the quadrilateral on the XZ-plane individually forming an angle with the X-axis of said plate substantially equal to one of the complementary angles +64 and −26 degrees, and mechanical coupling means motion of which is associated primarily with a face-shear mode of motion of said piezoelectric element.

HANS JAFFE.

REFERENCES CITED

The following references are of record in the file of this patent:

UNITED STATES PATENTS

| Number | Name | Date |
|---|---|---|
| 2,440,695 | Mason | May 4, 1948 |

OTHER REFERENCES

Mason, W. P., Proceedings of I.R.E., vol. 35, pages 1005–1012, October 1947. (Copy in 171—327—33a.)